Figure 1:
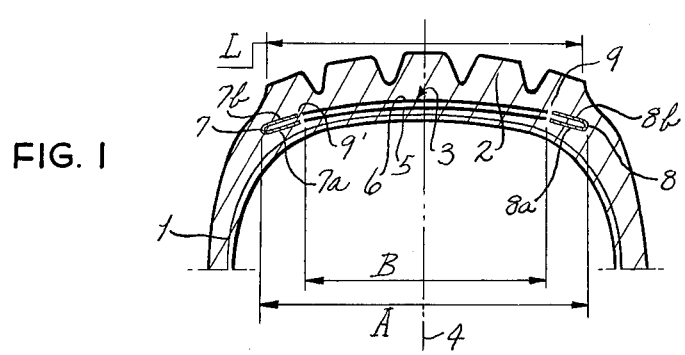

United States Patent [19]

Mirtain

[11] 4,034,791
[45] July 12, 1977

[54] PNEUMATIC TIRE WITH REINFORCING BELT

[75] Inventor: Henri J. Mirtain, Compiegne, France

[73] Assignee: Uniroyal, S.A., Clairoix, France

[21] Appl. No.: 694,276

[22] Filed: June 9, 1976

[51] Int. Cl.[2] .................. B60C 9/18; B60C 9/24
[52] U.S. Cl. ................... 152/361 FP; 152/361 DM
[58] Field of Search .............. 152/361 FP, 361 DM, 152/361 R, 354

[56] References Cited

U.S. PATENT DOCUMENTS

| | | | |
|---|---|---|---|
| 3,664,404 | 5/1972 | Twardzik | 152/361 FP |
| 3,717,190 | 2/1973 | Boileau | 152/361 FP |
| 3,949,797 | 4/1976 | Mirtain et al. | 152/361 FP |

FOREIGN PATENT DOCUMENTS

| | | | |
|---|---|---|---|
| 1,332,208 | 10/1973 | United Kingdom | 152/361 FP |

*Primary Examiner*—Drayton E. Hoffman
*Attorney, Agent, or Firm*—Philip Rodman

[57] ABSTRACT

The pneumatic tire incorporates a reinforcement belt comprising two superposed median plies of metallic material and two laterally disposed marginal plies of nonmetallic material. The marginal plies are folded to form superposed flaps, with the corresponding flaps of each marginal ply being substantially aligned.

In all embodiments of the invention at least one pair of corresponding opposite, laterally disposed flaps align with one of the median plies. In at least one embodiment of the invention the second pair of opposite, laterally disposed flaps align with the second median ply. In other embodiments of the invention the second pair of opposite, laterally disposed flaps overlap the terminal ends of the second median ply. And in still further embodiments of the invention the second pair of opposite, laterally disposed flaps are positioned radially outward or radially inward of the second median ply. In all embodiments of the invention there are at least two and at the most three layers of ply material at various points along the crosswise width of the reinforcing belt.

34 Claims, 10 Drawing Figures

PNEUMATIC TIRE WITH REINFORCING BELT

The present invention relates to pneumatic tires and more particularly to a pneumatic tire having an improved reinforcement belt construction.

The invention is especially applicable to radial carcass pneumatic tires. The term radial, as used herein, refers to directions perpendicular to the axis of rotation of the tire, and the term crosswise refers to directions parallel to said axis.

Tires having reinforcement belts are well known and generally include one or more plies of rubberized fabric reinforced with parallel filaments, cords or cables. A common type of reinforcement belt generally includes one or more plies incorporating metallic filaments or cables, associated with one or more plies incorporating nonmetallic filaments or cables.

In one known tire construction the reinforcement belt comprises a first pair of laterally spaced plies incorporating metallic cables. The plies are folded and substantially aligned in a crosswise direction with the folded portions forming one lateral crosswise extremity. A second pair of laterally spaced plies incorporating nonmetallic cables are also folded and substantially aligned, with the folded portion forming another lateral crosswise extremity. The first pair of folded plies is superposed with the second pair of folded plies, the folded ends of the second pair extending crosswise beyond the folded ends of the first pair without encompassing or bracketing the first pair.

One of the problems present in this known tire construction is an undesirable gyroscopic effect caused by the belt that adversely affects steering of the tires. This gyroscopic effect, which is attributable in part to a relatively large belt mass at the extreme lateral edges or marginal regions of the reinforcement belt, is especially noticeable during high speed movement of the tires. For example, any rotation of the steering wheel which changes the spin axis of the steered wheels is opposed by a gyroscopic restoring torque that is a function of the angular momentum of the steered wheels.

Another problem present in known tire constructions having reinforcing belts is the tendency of the marginal folds of a ply incorporating metallic cable to separate from the tread. The likelihood of such breakage can be reduced by using cables having finer wires, strands or filaments, but at considerably more cost than the coarser cable components.

A further problem of known tires with reinforcing belts is a decrease in travelling comfort due to the presence of relatively rigid metallic constituents at the edge portions of the reinforcing belt that can cause the tire to reflect or amplify unsmooth road conditions. This is especially apparent with tires having a reinforcing belt that comprises plies of metallic cables only. Such tires are relatively inadequate in deforming to permit expansion. Moreover the vulcanization and formation of profiles in the tread of such tires often requires complex and expensive molds having multiple segments.

It is thus desirable to provide a pneumatic tire having a reinforcement belt construction that minimizes the problems of gyroscopic effect and belt end separation, yet furnishes improved travel comfort, and is economical to manufacture.

Among the several objects of the invention are the provision of a pneumatic tire having a novel reinforcement belt construction of relatively low belt mass at the marginal edge portions of the reinforcing belt. A pneumatic tire incorporating a novel reinforcement belt construction which minimizes the likelihood of separation between the tread and the plies incorporating metallic cable, and a tire having a reinforcing belt construction that affords improved travelling comfort and is relatively inexpensive to manufacture. Other objects and features will be in part apparent and in part pointed out hereinafter.

The present invention relates to a pneumatic tire wherein an annular reinforcement belt surrounds a carcass intermediate the carcass and the tread in substantially symmetrical relationship to an equatorial plane of the tire. The reinforcement belt, in cross section, comprises two crosswise spaced, opposite, laterally disposed plies of non-metallic material, each folded to form a pair of confronting flap portions having ends directed toward the equatorial plane of the tire. Homologous ends of the flap portions are aligned and have respective predetermined crosswise spacings therebetween.

A first ply of metallic material is disposed intermediate a first pair of opposite, laterally disposed flaps in alignment with the ends of the flaps, enabling the flaps to form terminal extensions of the first ply of metallic material.

A second ply of metallic material, which can be of lesser or greater crosswise extent than the first ply of metallic material, is arranged adjacent the first ply of metallic material to provide at least two and at the most three layers of ply material at various points along the crosswise width of the reinforcing belt. The crosswise extent of the second ply of metallic material is predetermined so as not to extend past the marginal ends of the opposite, laterally disposed plies of nonmetallic material. Under this arrangement the reinforcing belt constituents include two plies of metallic material in the median portion and two plies of nonmetallic material at the marginal end portions.

In at least one embodiment of the invention the second ply of metallic material is disposed intermediate the second pair of opposite, laterally disposed flaps in alignment with the ends of the flaps to form terminal extensions of the second ply of metallic material.

In still other embodiments of the invention only one ply of metallic material is aligned with the ends of one pair of opposite, laterally disposed flaps of nonmetallic material. The second pair of opposite, laterally disposed flaps of non-metallic material are bent over the terminal ends of the second ply of metallic material to form a third layer in the median portion of the reinforcement belt.

The invention also contemplates embodiments wherein the second ply of metallic material is entirely disassociated from the second pair of opposite, laterally disposed flaps of nonmetallic material, the second ply being radially inward or outward of the second pair of flaps to form a third layer in the median portion of the reinforcing belt.

In still another embodiment of the invention one ply of metallic material is substantially aligned with the homologous ends of the first and second pairs of opposite laterally disposed flaps of nonmetallic material. The second ply of metallic material is arranged radially outward of the first ply of metallic material and the folded flaps to form a third layer of the reinforcing belt.

The invention accordingly comprises the constructions hereinafer described, the scope of the invention being indicated in the following claims.

In the accompanying drawing in which one embodiment of the invention is illustrated:

FIG. 1 is a fragmentary sectional view of a pneumatic tire incorporating one embodiment of the present invention; and, FIGS. 2–10 are schematic representations of reinforcement belt constructions incorporating further embodiments of the present invention, the belt construction being disassociated from the tire environment for purposes of clarity.

Referring now to the drawings, particularly FIG. 1, the pneumatic tire includes an annular carcass 1 of known radial construction surrounded at its outerlying crown portion by a tread 2 having a crosswise width L. A reinforcement belt 3 having a crosswise width A is disposed between the tread 2 and the carcass 1 substantially symmetrical to an equatorial plane 4 of the tire.

The reinforcement belt 3 includes a median portion formed of two radially superposed plies 5, 6 of substantially equivalent crosswise extent, indicated by B, and incorporate metallic wires or cables such as steel. Preferably the width B of the plies 5 and 6 is 50% to 90% of the width L of the tread 2.

The reinforcement belt 3 also includes two opposite, laterally disposed marginal plies 7 and 8, incorporating nonmetallic cables or filaments. Preferably the nonmetallic material is a textile form of an aromatic polyamide base such as the synthetic material known under the trademark designation Kevlar. The marginal plies 7 and 8 are folded in half to form respective flap pairs 7a, 7b and 8a, 8b. The ends of corresponding opposite, laterally disposed flaps 7a, 8a and 7b, 8b are substantially aligned and also substantially align with homologous terminal ends of the median plies 5 and 6 along substantially radial joints 9, 9'. Thus the folded portions of the marginal plies 7, 8 are directed away from the equatorial plane 4, with the respective superposed ends of the flaps 7a, 7b and 8a, 8b being directed toward the equatorial plane 4. Under this arrangement the opposite, laterally disposed flaps 7a, 8a and 7b, 8b form extensions of the respective mediam plies 5 and 6. The reinforcement belt is thus two layers thick at all points along its crosswise width A.

In the embodiments of FIGS. 2–9 the superpose median plies of metallic wires have different crosswise widths and the superposed flaps of each folded marginal ply of nonmetallic filaments have different crosswise widths.

In all the embodiments disclosed herein the filament, cable or wire elements in the plies of metallic and nonmetallic material have known orientations. For example the angle of inclination of cable in the plies of metallic material is in the range of 14° to 50°, preferably 18°. The angle of inclination of filaments in the plies of nonmetallic material is in the range of 50° to 30 °, preferably 12°. The ply elements are arranged at opposite angles to each other, preferably symmetrical to the equatorial plane thereby intersecting from one layer to the other.

The reinforcement belt 3 in each of the embodiments disclosed herein, is wider than the tread 2 and extends crosswise into the shoulder areas of the tire. The maximum overall width A of the belt 3 is preferably 125% of the width L of the tread 2.

Figure 2:
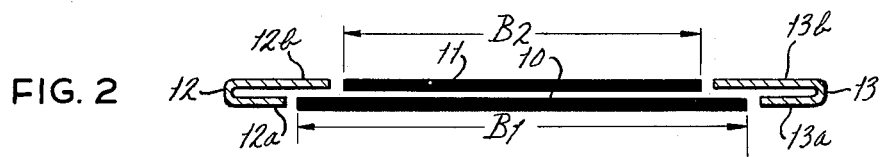

Referring particularly to the embodiment of FIG. 2, the reinforcement belt comprises a relatively wide median ply 10 of metallic wire having a crosswise extent indicated by $B_1$ disposed radially inward of a relatively narrow median ply 11 of metallic wire having a crosswise extent indicated by $B_2$. The width $B_1$ of the wide median ply can be of a size that is smaller than, identical to, or greater than that of the width L of the tread 2, whereas the width $B_2$ of the narrow median ply can range in size from 50% to 90% of the width L of the tread 2. The aforesaid relationships between $B_1$, $B_2$, and the tread width L are also applicable to all other hereinafter described embodiments.

The median plies 10 and 11 are arranged intermediate a pair of folded marginal plies 12 and 13 of nonmetallic filaments, which folded plies comprise flaps 12a, 12b and 13a, 13b. The opposite laterally disposed flaps 12a and 13a, which are relatively narrow, align with and extend beyond the terminal ends of the inner median ply 10 while the opposite laterally disposed flaps 12b and 13b, which are relatively wide, align with and extend beyond the terminal ends of the outer median ply 11.

As shown in FIG. 2 the crosswise extents of the median plies 10 and 11 are unequal and the crosswise extent of one pair of opposite, laterally aligned flaps 12a, 13a is different from that of the other pair of opposite laterally aligned flaps 12b, 13b. Consequently the opposite, laterally disposed flaps 12b and 13b overlap the joint between the opposite, laterally disposed flaps 12a, 13a and the terminal ends of the inner median ply 10. Also the inner median ply 10 overlaps the joint between the corresponding opposite laterally disposed flaps 12b, 13b and the terminal ends of the outer median ply 11. Under this arrangement the joints of aligned homologous ply ends at a first radial distance from the axis of rotation of the tire and the joints of aligned homologous ply ends at a second radial distance therefrom are substantially staggered with respect to the equatorial plane 4, with the reinforcement belt being two layers thick at all points along its crosswise width.

Figure 3:
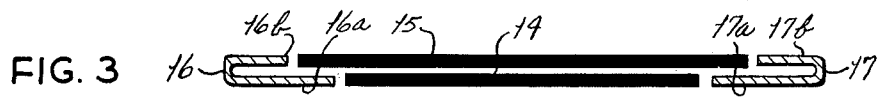

The embodiment of FIG. 3, which is substantially a mirror image of the embodiment of FIG. 2, comprises a relatively narrow median ply 14 of metallic wire disposed radially inward of a relatively wide median ply 15 of metallic wire. The median plies 14 and 15 are arranged intermediate a pair of folded marginal plies 16 and 17 of nonmetallic filaments, which folded plies respectively comprise flaps 16a, 16b and 17a, 17b. The opposite disposed flaps 16a, 17a, and 16b, 17b extend beyond the terminal ends of the respective median plies 14 and 15 in substantial alignment therewith, and the joints between aligned homologous ply ends are symmetrically staggered with respect to the equatorial plane 4 as previously described. The reinforcement belt is thus two layers thick at all points along its crosswise width.

Figure 4:
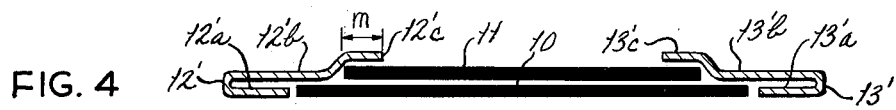

In the embodiment of FIG. 4 the reinforcement belt comprises the relatively wide median ply 10 disposed radially inward of the relatively narrow median ply 11. A pair of folded marginal plies 12' and 13', arranged at opposite ends of the median plies 10 and 11, comprise opposite, laterally disposed relatively narrow flaps 12' a and 13' a having ends that form an aligned joint with the terminal ends of the inner median ply 10. The flaps 12' a and 13' a thus form an extension of the inner median ply 10.

The folded marginal plies 12' and 13' also include relatively wide flaps 12'b-12'c and 13'b-13°c bent over the respective terminal ends of the outer median ply 11. The respective bends or steps are defined between the flap portions 12'b, 12'c and 13'b, 13'c. The corresponding opposite, laterally disposed flap portions 12'b and 13'b are substantially coplanar with the outer median ply 11 thereby forming an extension of the ply 11. The corresponding opposite, laterally disposed flap portions 12'c and 13'c overlay the terminal ends of the ply 11 by an amount m. The dimension m preferably ranges from 10% of the tread width L to 50% of the width of the narrow median ply. Thus the reinforcement belt is two layers thick at its marginal end portions, three layers thick at laterally spaced sections defined between the terminal ends of the median play 11 and the free ends of the flap portions 12'c and 13'c, and two layers thick in the region intermediate the laterally spaced three layer sections.

Figure 7:
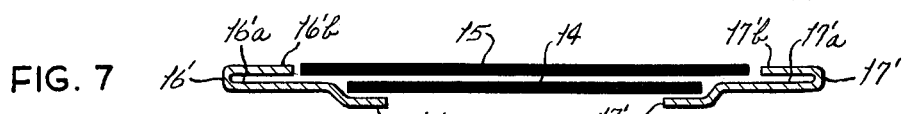

In the embodiment of FIG. 7, which is substantially a mirror image of the FIG. 4 embodiment, the reinforcement belt comprises the relatively narrow median ply 14 disposed radially inward of the relatively wide median play 15. A pair of folded marginal plies 16' and 17', arranged at opposite ends of the median plies 14 and 15, includes opposite, laterally disposed, relatively narrows flaps 16'b and 17'b having ends that form an aligned joint with the terminal ends of the outer median ply 15.

Each of the folded plies 16', 17' also include relatively wide flaps 16'a-16'c and 17'a-17c bent over the respective terminal ends of the inner median ply 14. The respective bends or steps are defined between the flap portions 16'a, 16'c and 17'a, 17'c. The corresponding opposite, laterally disposed flap portions 16'a and 17'a are substantially coplanar with the inner median ply 14, thereby forming an extension of the ply 14. The corresponding opposite laterally disposed flap portions 16'c and 17'c overlay the terminal ends of the median ply 14 by equal amounts m previously described with respect to the embodiment of FIG. 4. Thus the reinforcement belt is two layers thick at its marginal end portions, three layers thick at laterally spaced sections defined between the terminal ends of the median ply 14 and the free ends of the flap portions 16'c and 17'c, and two layers thick in the region intermediate the laterally spaced three layer sections.

Figure 5:
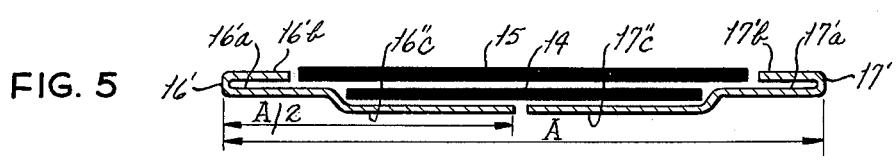

The reinforcement belt of the embodiment of FIG. 5 includes the relatively narrow median ply 14 disposed radially inward of the relatively wide median ply 15. A pair of folded marginal plies 16', 17' are disposed at opposite ends of the median plies 14, 15 in an arrangement resembling that of the embodiment of FIG. 7. The opposite laterally disposed flaps 16'b and 17'b, which are relatively narrow, form an aligned joint with the terminal ends of the outer median ply 15 in a manner identical to that of the FIG. 7 embodiment. The flaps 16'b and 17'b thus form terminal extensions of the ply 15.

The opposite, laterally disposed flaps 16'a-16''c and 17'a-17''c, which are relatively wide, are bent over the terminal ends of the inner median ply 14, the respective bends being defined between the flap portions 16'a, 16''c and 17'a, 17''c. The crosswise extent of each flap 16'a, 16''c and 17'a, 17''c is indicated by A/2 which represents approximately one half of the overall belt width A measured between the folded ends of the marginal plies 16' and 17'.

As in the FIG. 5 embodiment the substantially aligned opposite laterally disposed flap portions 16'a and 17'a are substantially coplanar, with the inner median ply 14 thereby forming an extension of the ply 14. The substantially aligned opposite, laterally disposed flap portions 16''c and 17''c overlay substantially the entire crosswise extent of the inner median ply 14. Thus the embodiment of FIG. 5 differs from the embodiment of FIG. 7 by the provision of the elongated flap portions 16''c and 17''c. Under this arrangement the reinforcement belt is two layers thick at its marginal end portions and three layers thick along the median portion between the terminal ends of the narrow median ply 14.

Figure 6:
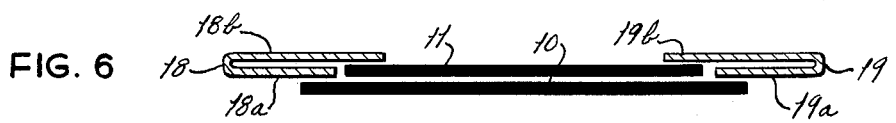

In the embodiment of FIG. 6 the reinforcement belt comprises the relatively wide median ply 10 disposed radially inward of the relatively narrow median ply 11. A pair of folded marginal plies 18 and 19 are arranged at the terminal ends of the mediam ply 11 and include opposite, laterally disposed relatively narrow flaps 18a and 19a having ends that form an aligned joint with the terminal ends of the narrow median ply 11. The flaps 18a and 19a thus form an extension of the ply 11.

The folded plies 18 and 19 also include opposite, laterally dispose, relatively wide flaps 18b and 19b positioned radially beyond the relatively narrow median ply 11 so as to straddle the radially outer side of the joints between the opposite, laterally disposed flaps 18a, 18a and the terminal ends of the ply 11 to overlap the ply 11 by equal amounts m previously described with respect to the embodiment of FIG. 4. The relatively wide median ply 10 straddles the radially inner side of said joints without extending to the marginal ends of the folded plies 18 and 19. Under this arrangement the reinforcement belt is two layers thick at its marginal end portions, three layers thick at laterally spaced sections defined between the terminal ends of the median ply 10 and the free ends of the flaps 18b, 19b, and two layers thick in the region intermediate the laterally spaced three layer sections.

Figure 8:
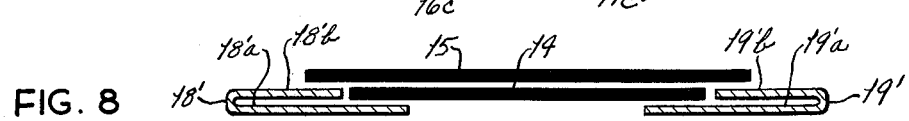

In the embodiment of FIG. 8, which is substantially a mirror image of the embodiment of FIG. 6, the reinforcement belt comprises the relatively narrow median ply 14 disposed radially inward of the relatively wide median ply 15. A pair of folded marginal plies 18' and 19' are arranged at the terminal ends of the median ply 14 and include opposite, laterally disposed, relatively wide flaps 18'b and 19'b having ends that form aligned joints with the respective terminal ends of the narrow median ply 14. The flaps 18'b and 19'b thus form an extension of the ply 14.

The folded plies 18' and 19' also include opposite, laterally disposed relatively wide flaps 18'a and 19'a positioned radially inward of the relatively narrow median ply 14 so as to straddle the radially inner side of the joints between the opposite, laterally disposed flaps 18'b, 19'b and the terminal ends of the ply 14 to overlay the end portions of the ply 14. The relatively wide median ply 15 straddles the radially outer side of said joints without extending to the marginal ends of the folded plies 18' and 19'. Under this arrangement the reinforcement belt is two layers thick at its marginal end portions, three layers thick at laterally spaced sections defined between the terminal ends of the median ply 15 and the free ends of the flaps 18'a, 19'a, and two layers thick in the region intermediate the laterally spaced three layer sections.

A pneumatic tire incorporating the FIG. 8 embodiment has been manufactured in accordance with the following characteristics.

| Item | Dimension |
| --- | --- |
| Tire size | 185 R × 14 |
| Tread width | L = 120 mm. |
| Overall belt width | A = 150 mm. |
| Width of the wide ply (15) of metallic material | $B_1$ = 130 mm. |
| Width of the narrow ply (14) of metallic material | $B_2$ = 90 mm. |
| Width of the narrow flaps (18'b, 19'b) of nonmetallic material | 30 mm. |
| Width of the wide flaps (18'a,19'a) of nonmetallic material | 40 mm. |
| Overlap of the narrow ply of metallic material (14) on each wide flap (18'a,19'a) of nonmetallic material | m = 10 mm. |
| Angle of inclination of the cables of metallic and nonmetallic material | ± 18° |

Figure 9:
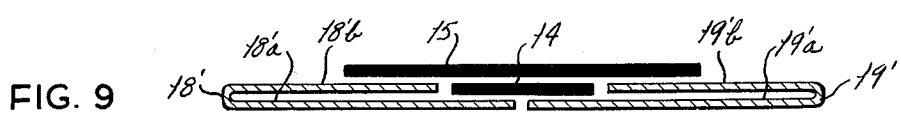

In the embodiment of FIG. 9 the reinforcement belt comprises the relatively narrow median ply 15 disposed radially inward of the relatively wide median ply 15. A pair of folded marginal plies 18' and 19' are arranged at the terminal ends of the median ply 14 and include opposite, laterally disposed, relatively narrow flaps 18'b and 19'b having ends that form an aligned joint with the terminal ends of the narrow median ply 14. The flaps 18'b and 19'b thus form an extension of the median ply 14.

The folded plies 18' and 19' also include opposite, laterally disposed, relatively wide flaps 18'a and 19'a positioned radially inward of the relatively narrow median ply 14. The ends of the flaps 18'a and 19'a extend to the equatorial plane 4 thereby straddling the radially inner side of the joints between the opposite laterally disposed flaps 18'b, 19'b and the terminal ends of the ply 14. The relatively wide median ply 15 straddles the radially outer side of said joints without extending to the marginal ends of the folded plies 18' and 10'. Under this arrangement the reinforcement belt is two plies thick at the marginal end portions and three plies thick at the median portion defined between the terminal ends of the median ply 15.

Figure 10:
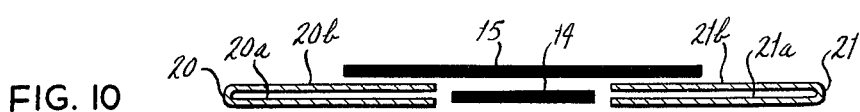

In the embodiment of FIG. 10 the reinforcement belt comprises the relatively narrow median ply 14 disposed radially inward of the relatively wide median ply 15. A pair of laterally spaced marginal plies 20 and 21 are respectively folded in half to form the flap pairs 20a, 20b and 21a, 21b. The oppositie, laterally disposed flaps 20a, 21a and 20b, 20b are substantially aligned and also substantially align with terminal ends of the median ply 14. The superposed flaps 20a, 20b and 21a, 21b thus substantially form extensions of the median ply 14.

The relatively wide median ply 15 straddles the radially outer side of the joints between the terminal ends of the ply 14 and the opposite, laterally disposed flaps 20a, 21a and 20b, 21b. Under this arrangement the reinforcement belt is two layers thick at its marginal end portions, three layers thick at laterally spaced sections defined between the terminal ends of the median ply 15 and the ends of the flaps 20a, 20b and 21b, and two layers thick in the region intermediate the three layer sections.

As will be apparent to those skilled in the art the median plies of metallic material do not extend between confronting folded portions of the marginal plies of nonmetallic material.

Some advantages of the present invention evident from the foregoing description includea tire having a reinforcementbelt with relatively lightweight, substantially inextensible marginal edge portions for reducing the undesirable gyroscopic effect and thereby facilitating operation of the steering wheel. The use of Kevlar material or an equivalent substance in the marginal plies renders said plies lightweight and substantially inextensible. The disclosed arrangements of marginal nonmetallic filament plies with median plies of metallic material improves travel confort and minimizes the hazard of belt ply separation at the edges of the tread, since the plies of metallic materal are intermediate the edge portions of the belt, are not turned up. A further advantage is that there are not less than two plies nor more than three plies of belt material at all points throughout the crosswise extent of the reinforcing belt and no ply surrounds another ply. Moreover the plies of nonmetalllic material are not inserted between plies of metallic material, and the plies of metallic material are not inserted between confronting folded portions of the plies of nonmetallic material, making it possible to reduce the number of superposed plies or flaps to a minimum. The disclosed tire construction incorpoarates a reinforcement belt or relatively simple design, is economical to maufacture since a two part vulcanization mold can be used, and provides improved operating reliability.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic tire comprising an annular carcass having a radially outerlying crown portion, a tread constituting an annular cover surrounding the crown portion of said carcass, and an annular reinforcement belt interpositioned between the crown portion of said carcass and said tread, said reinforcement belt comprising, in cross-section, a pair of opposite, laterally disposed, crosswise spaced, first and second plies of a first cord material, each of said first and second plies being folded to form two respective flap portions having ends directed toward an equatorial plane of the tire and respective folded margins directed away from said equatorial plane, one of the flaps of each said first and second folded ply confronting at least a portion of the other said respective flap, a first ply of second cord material having opposite terminal ends being disposed between homologous ends of one of the pairs of corresponding opposite, laterally disposed flap portions such that said one pair of opposite, laterally disposed flap portions extends laterally beyond corresponding terminal ends of said first ply of second cord material in substantial alignment with said corresponding opposite terminal ends, and a second ply of said second cord material having opposite terminal ends, said second ply of second cord material being disposed adjacent said first ply of second cord material such that said second ply of second cord material does not extend laterally beyond the folded margins or between the confronting flap portions of the first and second folded plies, whereby said first and second plies of the first cord material are positioned at the marginal ends of said reinforcement belt and said first and second plies of the second cord material are positioned at the median portion of the reinforcement belt.

2. A pneumatic tire as claimed in claim 1 wherein said first cord material comprises textile cords and said second cord material comprises metallic wire cords.

3. A pneumatic tire as claimed in claim 2 wherein said textile cord material is formed of a synthetic substance on an aromatic polyamide base identified by the trade name Kevlar.

4. A pneumatic tire as claimed in claim 1 wherein said reinforcement belt is symmetrical with respect to the equatorial plane of said tire.

5. A pneumatic tire as claimed in claim 1 wherein homologous ends of the first and second pairs of corresponding opposite, laterally disposed flaps are crosswise aligned.

6. A pneumatic tire as claimed in claim 1 wherein said first pair of corresponding opposite, laterally disposed flap portions constitute substantially contiguous extension of said first ply of second cord material.

7. A pneumatic tire as claimed in claim 1 wherein the crosswise width of said reinforcement belt has a maximum width of 125% of the tread width.

8. A pneumatic tire as claimed in claim 7 wherein the second ply of second cord material is of a different crosswise extent than the first ply of second cord material, the narrower of said plies of second cord material ranging in size from 50% to 90% of the crosswise width of said tread.

9. A pneumatic tire as claimed in claim 8 wherein the wider of said plies of second cord material ranges in size from a crosswise extent less than said tread width to a crosswise extent greater than said tread width.

10. A pneumatic tire as claimed in claim 1 wherein said second ply of second cord material is of lesser crosswise extent than the crosswise distance from one of the folded margins to the other said folded margin.

11. A pneumatic tire as claimed in claim 1 wherein said second ply of second cord material is disposed between homologous ends of the other pair of corresponding opposite, laterally disposed flap portions such that said other pair of corresponding opposite, laterally disposed flap portions extend crosswise beyond corresponding terminal ends of said second ply of second cord material in substantial alignment with the corresponding terminal ends of said second ply of second cord material.

12. A pneumatic tire as claimed in claim 11 wherein said other pair of corresponding opposite, laterally disposed flap portions constitute substantially contiguous extensions of said second ply of second cord material.

13. A pneumatic tire as claimed in claim 11 wherein the crosswise extent of the first and second plies of second cord material are substantially equivalent.

14. A pneumatic tire as claimed in claim 13 wherein the crosswise extent of said first and second plies of second cord material is within the range of 50% to 90% of the crosswise width of said tread.

15. A pneumatic tire as claimed in claim 11 wherein said frist ply of second cord material is of greater crosswise extent than the second ply of second cord material.

16. A pneumatic tire as claimed in claim 1 wherein the crosswise extent of each flap portion is substantially equivalent.

17. A pneumatic tire as claimed in claim 1 wherein the crosswise extent of each flap of the other pair of corresponding opposite, laterally disposed flap portions is greater than the crosswise extent of each flap of said one pair of corresponding opposite, laterally disposed flap portions.

18. A pneumatic tire as claimed in claim 17 wherein said second ply of second cord material is disposed between homologous free ends of the other pair of corresponding opposite, laterally disposed flap portions such that said other pair of corresponding opposite, laterally disposed flap portions extend crosswise beyond the corresponding terminal ends of said second ply of second cord material in substantial alignment with the corresponding terminal ends of said second ply of second cord material.

19. A pneumatic tire as claimed in claim 18 wherein the first ply of second cord material is of greater crosswise extent than the second ply of second cord material and is disposed radially inward of the second ply of second cord material.

20. A pneumatic tire as claimed in claim 18 wherein the first ply of second cord material is of lesser crosswise extent than the second ply of second cord material and is disposed radially inward of the second ply of second cord material.

21. A pneumatic tire as claimed in claim 17 wherein said one pair of corresponding opposite, laterally disposed flap portions is disposed radially outwardly of said other pair of corresponding opposite, laterally disposed flap portions.

22. A pneumatic tire as claimed in claim 21 wherein the second ply of second cord material is of greater crosswise extent than the first ply of second cord material and is disposed radially outward of the first ply of second cord material.

23. A pneumatic tire as claimed in claim 20 wherein the crosswise extent of each flap of the other pair of corresponding opposite, laterally disposed flap portions is approximately one-half the crosswise distance between said folded margins.

24. A pneumatic tire as claimed in claim 17 wherein each flap of said one pair of corresponding opposite, laterally disposed flap portions is disposed radially inward of said other pair of corresponding opposite, laterally disposed flap portions.

25. A pneumatic tire as claimed in claim 24 wherein the second ply of second cord material is of greater crosswise extent than the first ply of second cord material and is disposed radially inward of the first ply of second cord material.

26. A pneumatic tire as claimed in claim 17 wherein each flap of the other pair of corresponding opposite, laterally disposed flap portions overlaps the terminal ends of one of the plies of second cord material.

27. A pneumatic tire as claimed in claim 26 wherein the crosswise width of said overlap is at least 10% of the tread width.

28. A pneumatic tire as claimed in claim 17 wherein said second ply of second cord material is of greater crosswise extent than the crosswise space between homologous free ends of said other pair of corresponding opposite, laterally disposed flap portions, said other pair of corresponding opposite, laterally disposed flap portions being folded over the terminal ends of said second ply of second cord material and being substantially coplanar with said second ply of second cord material between the folded over portion and the folded margins.

29. A pneumatic tire as claimed in claim 28 wherein said second ply of second cord material is of lesser crosswise extent than said first ply of second cord material.

30. A pneumatic tire as claimed in claim 29 wherein said second ply of second cord material is disposed radially outward of said first ply of second cord material.

31. A pneumatic tire as claimed in claim 29 wherein said second ply of second cord material is disposed radially inward of said first ply of second cord material.

32. A pneumatic tire as claimed in claim 31 wherein the crosswise extent of each flap of said other pair of corresponding opposite, laterally disposed flap portions is approximately one-half the crosswise distance between said folded marginal ends.

33. The pneumatic tire as claimed in claim 32 wherein the ends of said other pair of opposite, laterally disposed flap portions form a butt joint substantially at said equatorial plane.

34. A pneumatic tire as claimed in claim 16 wherein said other pair of corresponding opposite, laterally disposed flap portions extend crosswise beyond the corresponding terminal ends of said first ply of second cord material in substantial alignment with said corresponding opposite terminal ends, said seond ply of second cord material being disposed radially outward of said first and second folded plies and said first ply of second cord material.

* * * * *